US012561240B2

(12) United States Patent
Chatterjee et al.

(10) Patent No.: US 12,561,240 B2
(45) Date of Patent: Feb. 24, 2026

(54) LOOK-UP TABLE-BASED IN-MEMORY COMPUTING SYSTEM

(71) Applicant: University of Florida Research Foundation, Incorporated, Gainesville, FL (US)

(72) Inventors: Baibhab Chatterjee, Gainesville, FL (US); Swarup Bhunia, Gainesville, FL (US); Peyman Dehghanzadeh, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 18/769,985

(22) Filed: Jul. 11, 2024

(65) Prior Publication Data

US 2025/0028635 A1 Jan. 23, 2025

Related U.S. Application Data

(60) Provisional application No. 63/514,386, filed on Jul. 19, 2023.

(51) Int. Cl.
*G06F 12/02* (2006.01)

(52) U.S. Cl.
CPC ............................... *G06F 12/0292* (2013.01)

(58) Field of Classification Search
CPC ............. G06F 12/0292; G06F 9/30014; G06F 9/30036; G06F 9/3887; G06F 15/7821; H03K 19/17728; G06N 3/063
See application file for complete search history.

(56) References Cited

U.S. PATENT DOCUMENTS

| | | | | |
|---|---|---|---|---|
| 11,941,511 B1* | 3/2024 | Cassidy | ................ | G06N 3/049 |
| 2016/0124651 A1* | 5/2016 | Sankaranarayanan | ...................... | G06F 9/3004 |
| | | | | 711/165 |
| 2019/0102181 A1* | 4/2019 | Madduri | ............ | G06F 9/30196 |
| 2021/0111722 A1* | 4/2021 | Kalsi | ................ | H03K 19/1776 |

OTHER PUBLICATIONS

Ramanathan, et al., "Look-Up Table Based Energy Efficient Processing in Cache Support for Neural Network Acceleration," *53rd Annual IEEE/ACM International Symposium on Microarchitecture*, pp. 88-101, (2020).

Sutradhar, et al., "An Ultra-Efficient Look-Up Table Based Programmable Processing in Memory Architecture for Data Encryption," *IEEE 39th International Conference on Computer Design*, pp. 252-259, (2021), DOI: 10.1109/ICCD53106.2021.00049.

Fuketa, Hiroshi, "Lookup Table-based Computing-in-Memory Macro Approximating Dot Products without Multiplications for Energy-Efficient CNN Inference," *IEEE Transactions on Circuits and Systems I: Regular Papers*, vol. 70, No. 10, pp. 1-10, Oct. 2023.

* cited by examiner

*Primary Examiner* — Khoa D Doan
(74) *Attorney, Agent, or Firm* — Alston & Bird LLP

(57) ABSTRACT

A method and system are directed to providing a look-up table (LUT)-based computation method targeted toward compute-in-memory (CiM) applications. The method comprises a divide and conquer-based approach to provide a solution to scalability challenges in LUT-based mathematical operations for CiM applications. The divide and conquer approach distributes a complex operation into smaller, less complex operations.

20 Claims, 15 Drawing Sheets

LOOK-UP TABLE-BASED IN-MEMORY COMPUTING SYSTEM

CROSS REFERENCE TO RELATED APPLICATION

This application claims the priority of U.S. Provisional Application No. 63/514,386, entitled "LOOK-UP TABLE-BASED IN-MEMORY COMPUTING SYSTEM," filed on Jul. 19, 2023, the disclosure of which is hereby incorporated by reference in its entirety.

TECHNICAL FIELD

Various embodiments of the present disclosure relate to data processing, and more particularly to in-memory computing.

BACKGROUND

In traditional Von-Neumann computing, data may be stored in a separate memory, for example, static random-access memory (SRAM) array, which is accessed by programs during execution. Similarly, for emerging computing techniques such as neuromorphic systems, a SRAM array may be utilized to store data and weights, while multiply and accumulate (MAC) computing operations internal to a neuromorphic engine may happen elsewhere. Such a configuration may lead to large memory-fetch latency and power consumption, which is the primary motivation behind compute-in memory (CiM) implementations, where the required mathematical operation (such as multiplication) may also occur in the memory array itself.

Specific technologies of CiM may include memories such as SRAM, dynamic random-access memory (DRAM), flash memory, resistive random-access memory (RRAM), phase-change memories (PCM) and spin-transfer torque magnetic random-access memory (STT-MRAM). Although newer technologies such as RRAM, PCM and STT-MRAM hold immense promise for highly energy-efficient, low area-overhead, low-latency CiM, these technologies are relatively immature, and scalability is an issue. Complementary Metal-Oxide-Semiconductor (CMOS)-based digital CiM is more mature and may be produced at scale, but requires higher energy consumption, has larger area overhead and compute latency, and has limitations in compute parallelism due to routing congestion. Analog CiM is also relatively matured and may have lower area and energy consumption than digital but has lower accuracy in real applications due to noise and intrinsic transistor mismatches.

BRIEF SUMMARY

Various embodiments described herein relate to LUT-based methods, apparatuses, and systems for implementation of compute-in memory (CiM) architectures. The disclosed embodiments may be used in applications, such as multiply and accumulate (MAC) cores for machine learning and signal processing applications, and single instruction multiple data (SIMD) operations for parallel computing. The disclosed embodiments may also be utilized for operations with any number of operand bits.

In some embodiments, a method for performing computations comprises generating one or more most significant bit sub-operations and a least significant bit sub-operation that are associated with a computing operation; retrieving, based on a first input operand and a second input operand, one or more select results from a plurality of results that are associated with the one or more most significant bit sub-operations and the least significant bit sub-operation from a memory array, wherein the one or more select results comprises one or more most significant bit sub-operation results and a least significant bit sub-operation result; generating one or more left-shifted most significant bit sub-operation results that are associated with the one or more most significant bit sub-operation results based on a determination that the computing operation comprises a multiplication operation; and generating a result of the computing operation based on an addition operation of the one or more left-shifted most significant bit sub-operation results and the least significant bit sub-operation result.

In some embodiments, generating the one or more most significant bit sub-operations and the least significant bit sub-operation comprises distributing the computing operation into a most significant bit multiplication operation and a least significant bit multiplication operation. In some embodiments, generating the one or more left-shifted most significant bit sub-operation results comprises applying one or more left shift operations on the one or more most significant bit sub-operation results. In some embodiments, the first input operand is associated with one or more weights and the second input operand is associated with input data. In some embodiments, the computing operation is associated with a multi-bit multiplier. In some embodiments, the computing operation comprises a 4-bit×4-bit multiplication operation. In some embodiments, the plurality of results comprises (i) a plurality of most significant bit sub-operation results based on a plurality of first input operand values and a plurality of second input operand values and (ii) a plurality of least significant bit sub-operation results based on the plurality of first input operand values and the plurality of second input operand values. In some embodiments, one or more of the plurality of least significant bit sub-operation results comprise one or more fixed values that are associated with one or more approximated results of performing the least significant bit sub-operation. In some embodiments, the first input operand comprises either a programmable value or a fixed value.

In some embodiments, a system for performing computations comprises a most significant bit multiplexer that is configured to generate a most significant bit sub-operation result that is associated with a computing operation based on a first input operand and a second input operand; a least significant bit multiplexer that is configured to generate a least significant bit sub-operation result that is associated with the computing operation; one or more shift registers that are configured to generate a left-shifted most significant bit sub-operation result; and a plurality of adders that are configured to generate a computing operation output by adding the left-shifted most significant bit sub-operation result with the least significant bit sub-operation result.

In some embodiments, the computing operation comprises a 4-bit×4-bit multiplication operation. In some embodiments, the most significant bit multiplexer or the least significant bit multiplexer comprises a plurality of 6-bit multiplexers that are configured to generate the most significant bit sub-operation result or the least significant bit sub-operation result as a 6-bit value. In some embodiments, the most significant bit multiplexer or the least significant bit multiplexer comprises a 2:1 multiplexer. In some embodiments, the most significant bit sub-operation result comprises a 6-bit most significant bit value and the least significant bit sub-operation result comprises a 6-bit least significant bit value. In some embodiments, the plurality of adders is configured to add the 6-bit most significant bit value to the 6-bit least significant bit value. In some embodiments, the plurality of adders comprises three half adders and three full adders. In some embodiments, the computing operation comprises a single instruction multiple data operation that is performed with the first input operand comprising a weight of a fixed value. In some embodiments, the least significant bit multiplexer is configured to generate the least significant bit sub-operation result based on a fixed value. In some embodiments, the system further comprises a plurality of memory arrays that are coupled to the most significant bit multiplexer and the least significant bit multiplexer in a data read/write path.

In some embodiments, a computing system comprises memory and one or more processors communicatively coupled to the memory. In some embodiments, the one or more processors are configured to generate one or more most significant bit sub-operations and a least significant bit sub-operation that are associated with a computing operation; retrieve, based on a first input operand and a second input operand, one or more select results from a plurality of results that are associated with the one or more most significant bit sub-operations and the least significant bit sub-operation from a memory array, wherein the one or more select results comprises one or more most significant bit sub-operation results and a least significant bit sub-operation result; generate one or more left-shifted most significant bit sub-operation results that are associated with the one or more most significant bit sub-operation results based on a determination that the computing operation comprises a multiplication operation; and generate a result of the computing operation based on an addition operation of the one or more left-shifted most significant bit sub-operation results and the least significant bit sub-operation result.

BRIEF DESCRIPTION OF THE DRAWINGS

Embodiments incorporating teachings of the present disclosure are shown and described with respect to the figures presented herein.

DETAILED DESCRIPTION

Figures 1A, 1B:
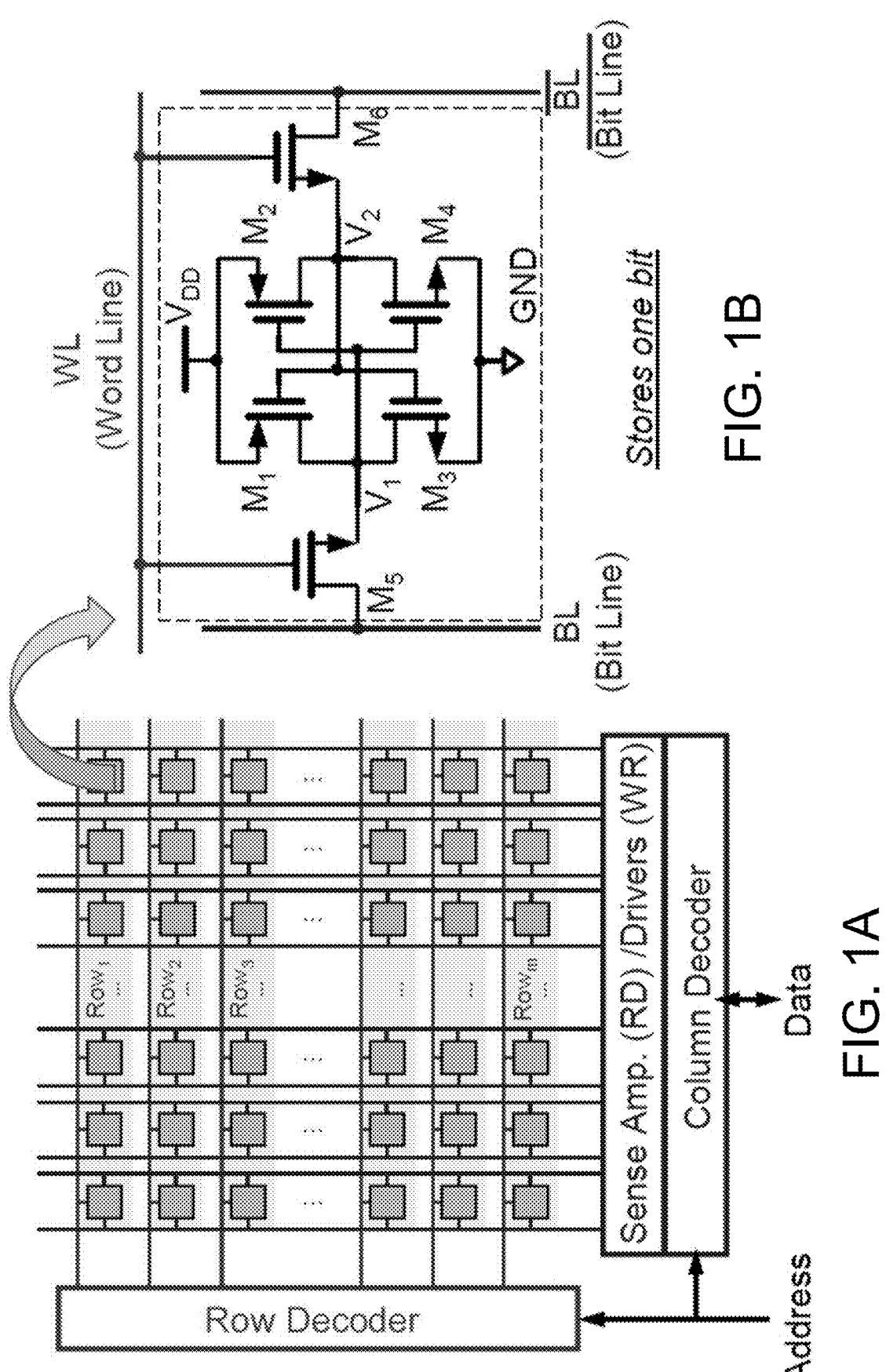
FIG. 1A illustrates an example static random-access memory (SRAM) array architecture.
FIG. 1B illustrates an example memory cell implemented using a plurality of transistors.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

General Overview and Example Technical Improvements

The present disclosure provides a low-energy, low-area-overhead, look-up table (LUT)-based computation method targeted toward compute-in-memory (CiM) applications. In some embodiments, the method comprises a divide and conquer (D&C)-based approach to provide a solution to scalability challenges (e.g., in terms of area/storage and energy consumption) in LUT-based computation, which otherwise benefits from speed and lower energy per computation. That is, look-up methods are faster and more energy efficient than performing mathematical computations. A method to further optimize the area and energy consumption through approximate LUT-based computation is also disclosed. As compared to traditional LUT-based methods, embodiments of the disclosed techniques offer, e.g., up to approximately 29.5 times, lower area overheads and up to approximately 3.3 times lower energy consumption without any loss of accuracy for example computing problems, such as MNIST image detection, and up to 50.9 times lower area overheads and up to approximately 6.2 times lower energy consumption for approximated implementations which may incur up to 2% accuracy degradation.

In accordance with various embodiments of the present disclosure, to provide maximum possible programmability, an architecture used for CiM applications is able to support multi-level, multi-cycle operations, wherein the contents of data storage memory may be used as the input to the LUT for computation, and once the computation is finished, results of the computation may be stored back to the memory.

Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

Example Implementation and System Architecture of Various Embodiments

A static random-access memory (SRAM) array architecture is depicted in FIG. 1A. The cells of the SRAM array, which may be implemented using a plurality of transistors as depicted in FIG. 1B, for example, are arranged in a matrix form, with row and column decoders configured to access specific row/columns in the matrix for either write or read operations. To solve latency issues and achieve higher parallelism in digital CiM, LUT-based computation methods may be used generate correct results of computations by selecting from a number of already stored results.

Figure 1C:
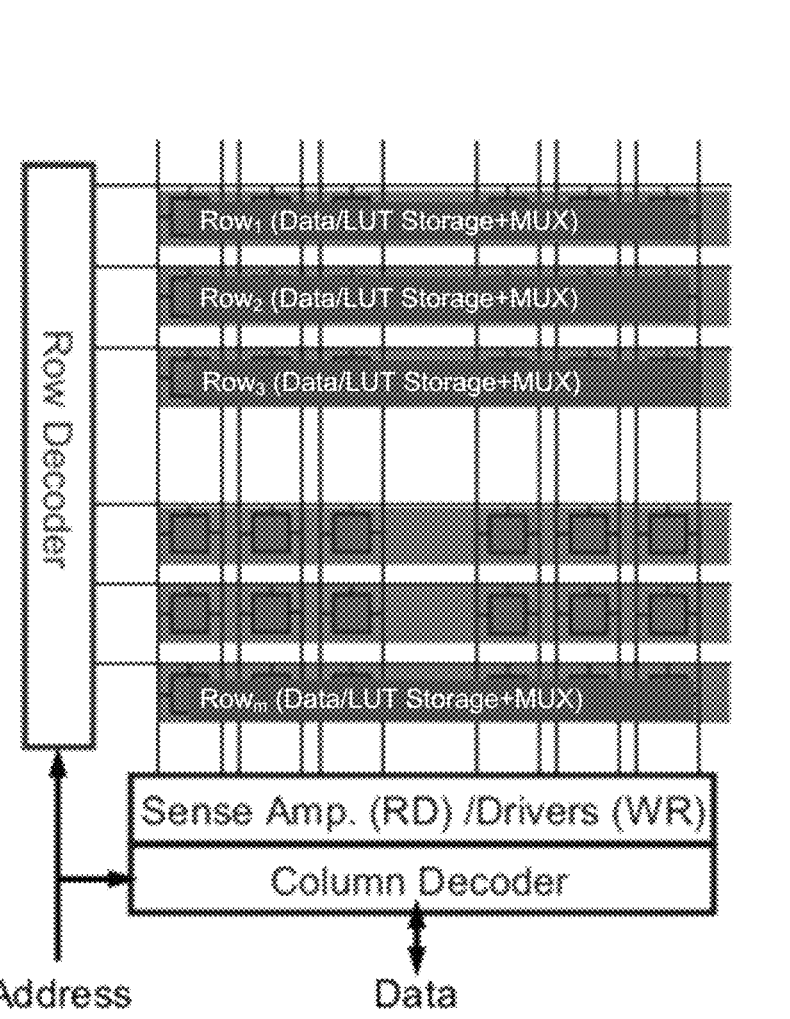
FIG. 1C illustrates an example LUT-based programmable memory for compute-in memory (CiM).

FIG. 1C depicts an example LUT-based implementation of digital CiM in a SRAM array 100. A digital LUT-based CiM operation provide advantages, such as (1) programmable storage, (2) fast (low-latency) computation due to look-up-based approach, (3) large noise margin, (4) negligible memory fetch energy and latency, and (5) no complex hardware. However, such a LUT-based configuration may not be very scalable. For example, the amount of storage and select logic required may quickly become prohibitively large as the operand size increases.

Figure 2A:
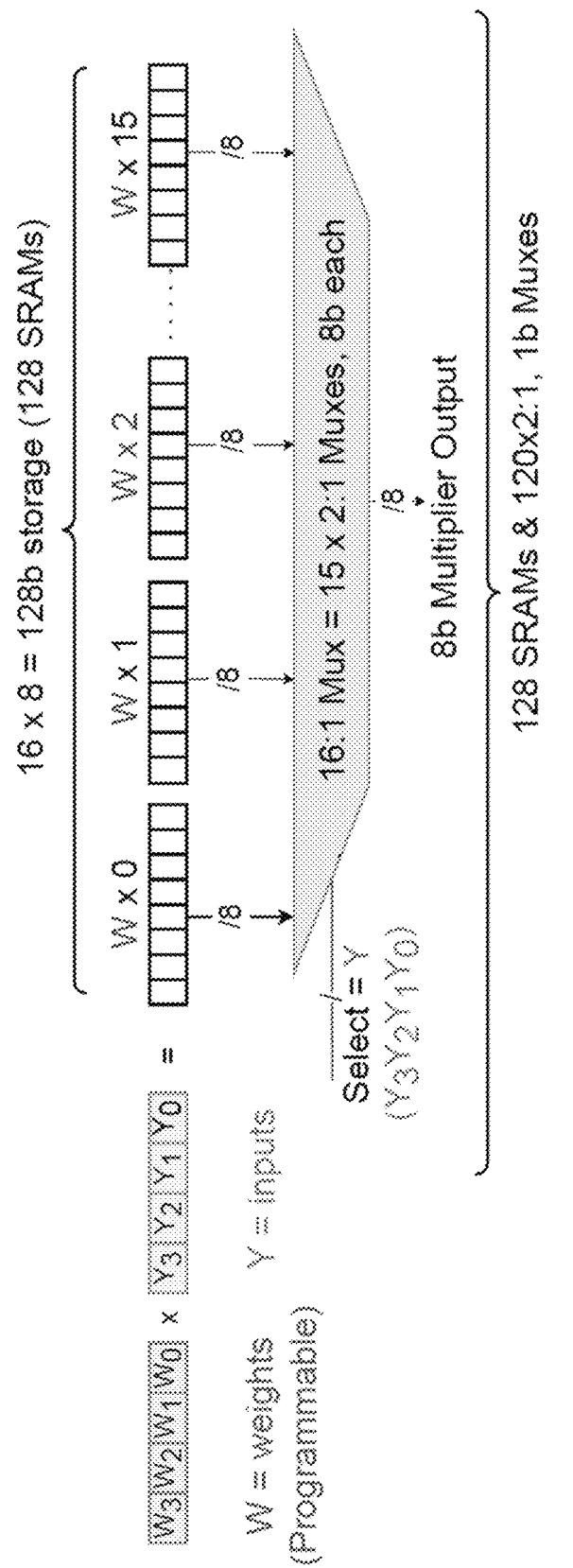
FIG. 2A is a diagram of an example LUT-based multiplier within a digital multiply and accumulate (MAC)-based neuron for performing computations.

FIG. 2A is a diagram of an example LUT-based multiplier within a digital multiply and accumulate (MAC)-based neuron for performing computations. In particular, FIG. 2A depicts a representation of a plurality of SRAM cells and 2:1 multiplexers (MUXes) for performing 4-bit to 4-bit multiplication, which may be a required range of bit resolutions in many neural network-based applications. As depicted in FIG. 2A, for 4-bit multiplications (4-bit weights, W×4-bit inputs, Y), assuming that the weights are fixed, $2^4$ different 8-bit results may be obtained based on the 4-bit inputs, which utilizes $2^4 \times 8$-bit=128-bit storage elements. Furthermore, selection of one result (Select=$(y_3 y_2 y_1 y_0)$) out of the $2^4$ results, a 16:1, 8-bit MUX may be required, which is equivalent to 15 instances of a 2:1 MUX for 8-bit operands, or 120 instances of a 1-bit, 2:1 MUX. Similarly, when scaled to 8-bit multiplications, 4096 SRAM cells and 4080 instances of 1-bit, 2:1 MUXes may be needed, which may make such a LUT-based multiplication to be impractical for CiM.

According to various embodiments of the present disclosure, divide and conquer (D&C) systems and methods are provided for low-energy, low-area-overhead LUT-based computation in CiM applications. The disclosed D&C systems and methods may efficiently address existing challenges while capitalizing on the advantages of LUT methods. For example, via D&C, a complex computation may be decomposed into smaller, more manageable sub-computations that are solved independently and combined to derive a solution for the complex computation. Thus, by breaking down computations into smaller components, individual handling of sub-calculations may provide improved efficiency and optimized solutions.

Figure 2B:
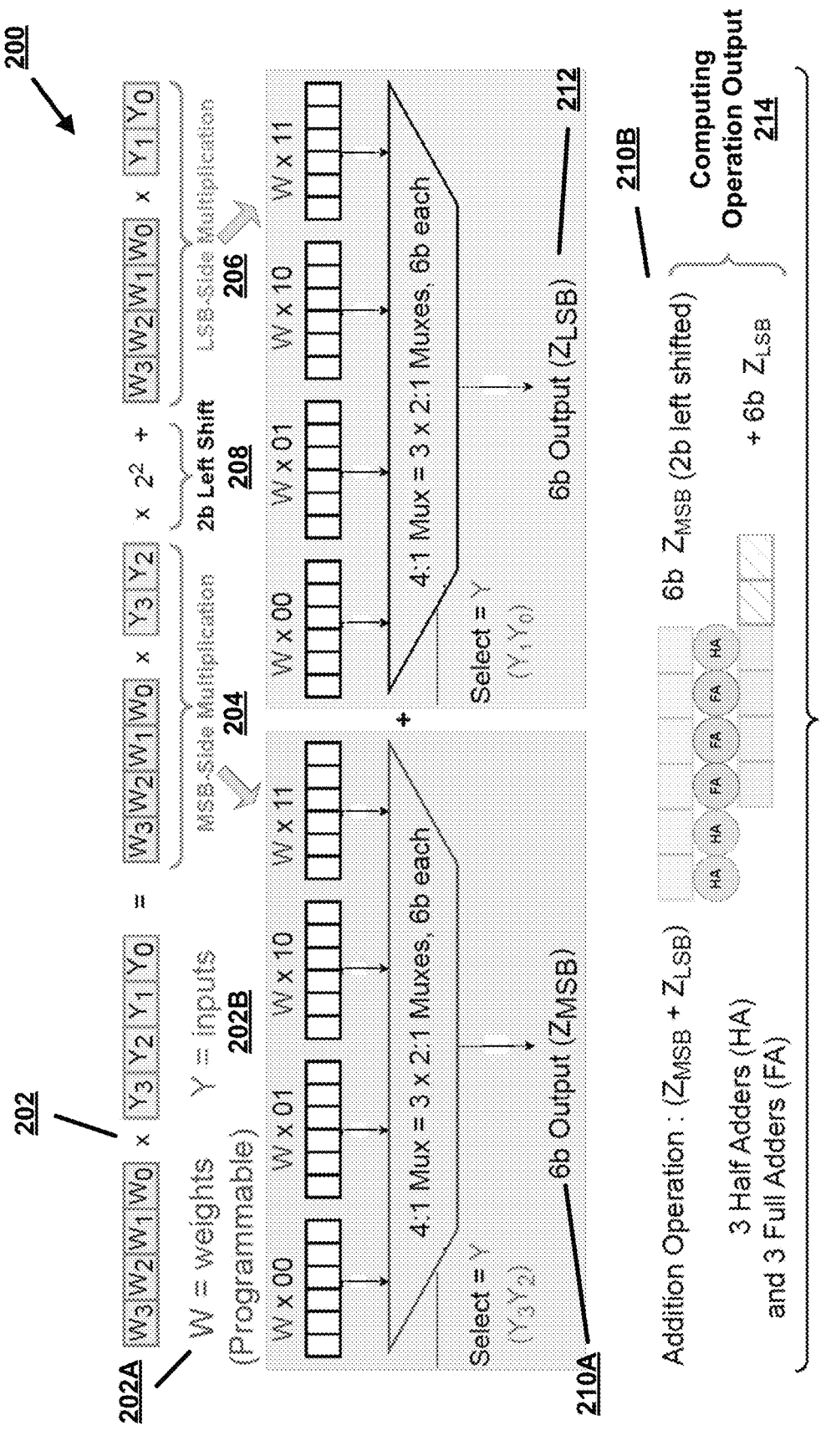
FIG. 2B is a diagram of an example architecture for performing multiplication operations in accordance with some embodiments discussed herein.

FIG. 2B is a diagram of an example architecture 200 for performing LUT-based multiplication operations using a divide and conquer (D&C)-based approach. In some embodiments, the architecture 200 is configured to perform a multiplication operation 202. As depicted, a 4-bit×4-bit, W×Y multiplication operation 202 comprising a multiplication of programmable weights, W, 202A and inputs, Y, 202B may be distributed into two separate 4-bit×2-bit multiplications, one for the most significant 2-bits of inputs, Y, 202B—the most significant bit (MSB)-side multiplication 204, and one for the least significant 2-bits of inputs, Y, 202B—the least significant bit (LSB)-side multiplication 206. Computation results of the MSB-side multiplication 204 and the LSB-side multiplication 206 may be stored to specific memory arrays coupled to MUXes in a data read/write path. The select inputs for each MUX may also be stored in memory and each select input may comprise 1-bit of information that is associated with an entire computation, which may be amortized over the entire memory. For example, a select input for a MUX that is associated with the MSB-side multiplication 204 may be associated with the most significant 2-bits of inputs, Y, 202B, and similarly, a select input for a MUX that is associated with the LSB-side multiplication 206 may be associated with the least significant 2-bits of inputs, Y, 202B.

A MSB-side multiplication result $Z_{MSB}$ 210A may undergo a left shift (208), for example, via one or more shift registers, of 2-bits to obtain MSB-side multiplication result $Z_{MSB}$ 2-bit left shifted 210B, which may be added to the LSB-side multiplication result $Z_{LSB}$ 212 to generate a final multiplication result. Thus, combining the two partial results (MSB-side multiplication result $Z_{MSB}$ 2-bit left shifted 210B and LSB-side multiplication result $Z_{LSB}$ 212) may provide a computing operation output 214 of the multiplication operation 202.

Performing smaller 4-bit×2-bit multiplications may comprise storing $2^2 \times 6$-bit=24-bits (for 4 possible 6-bit results) in addition to using a 4:1, 6-bit MUX (which is equivalent to 3 instances of a 2:1, 6-bit MUX, or 18 instances of a 2:1, 1-bit MUX). Furthermore, combining the 6-bit MSB-side multiplication result $Z_{MSB}$ 210A with the MSB-side multiplication result $Z_{MSB}$ 2-bit left shifted 210B and the LSB-side multiplication result $Z_{LSB}$ 212 may necessitate three instances of 1-bit half adders (HA) and three instances of 1-bit full adders (FA) which are associated with the left shift operation on MSB-side multiplication result $Z_{MSB}$ 210A before added to the LSB-side multiplication result $Z_{LSB}$ 212. As 1-bit FAs are used when handling three inputs, 3 FAs and 3 HAs may be sufficient. Accordingly, the architecture depicted in FIG. 2B may require a total of 24 storage elements (SRAM cells).

According to various embodiments of the present disclosure, a necessary number of memory (e.g., SRAM cells) for storage of multiplication results provided by the architecture 200 depicted in FIG. 2B may be optimized. In particular, for smaller 4-bit×2-bit multiplications, the 4-bit weights, W, 202A may only be multiplied with any of the combinations "00," "01," "10," or "11" for the 2-bit operand for inputs, Y, 202B. For the multiplication of W 202A×0 ("00"), only one bit (0) may need to be stored, which may be connected to all 6-bits of a first (from left) input of the 4:1 MUX. This optimized approach significantly reduces storage requirements for this specific multiplication. Similarly, for the multiplication of W 202A×1 ("01"), only the 4-bits of W may need to be stored. The four bits may be connected to the 4 LSBs of a second 6-bit input of the 4:1 MUX while the two MSBs may be connected to 0, thereby optimizing the storage configuration for this multiplication scenario. For the multiplication of W 202A×2 ("10"), there may be no need to store any bits. Instead, the stored 4-bit result of W 202A×01 may be left shifted by one bit and connected to four middle bits of a third 6-bit input of the 4:1 MUX. The MSB and LSB may be connected to "0." As for the multiplication of W 202A×3 ("11"), the five MSBs of the result may be stored. The five MSBs may be connected to respective five MSBs of a fourth (final) 6-bit input of the 4:1 MUX. Additionally, the LSB of the 6-bit input may be connected to the LSB of W, which is previously stored for the operation W 202A×01.

Figure 3:
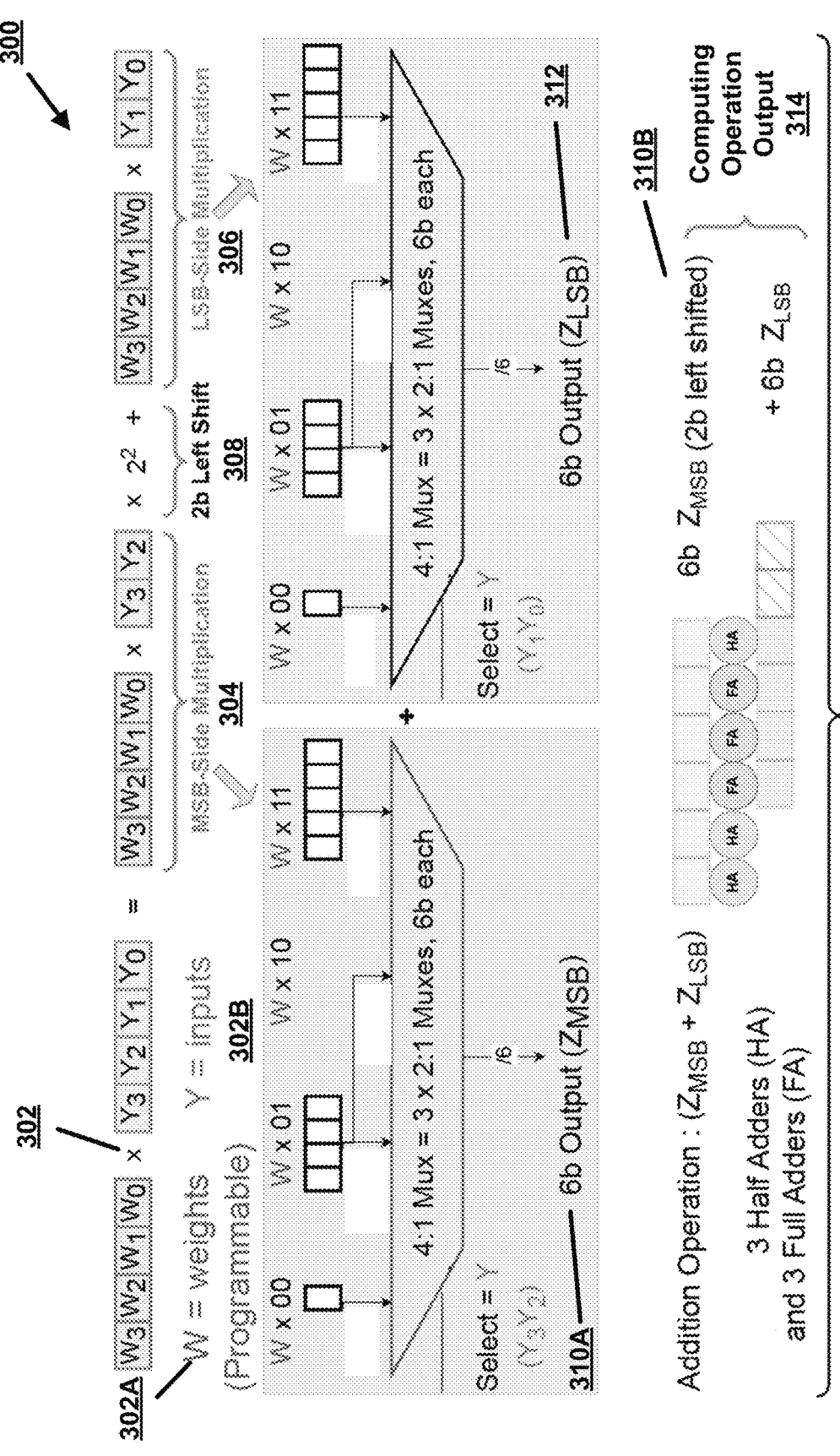
FIG. 3 is a diagram of an example architecture that is optimized for performing multiplication operations in MAC-based neurons and single instruction multiple data (SIMD) applications in accordance with some embodiments discussed herein.

Based on the aforementioned potential storage optimization, the smaller (4-bit×2-bit) multiplications may only require storing 10-bits. That is, the architecture 200 depicted in FIG. 2B may comprise 20 SRAM cells, when SRAM cells are used in both LSB-side multiplication (206) and MSB-side multiplication (204). However, by sharing the SRAM cells in the LSB and MSB sides, as depicted in FIG. 3 by a diagram of an example architecture 300 in accordance with some embodiments of the present disclosure, only 10 SRAMs may be required. The architecture 300 may also require 36 instances of a 2:1, 1-bit MUX for selecting multiplication results for the MSB-side multiplication result $Z_{MSB}$ 310A and LSB-side multiplication result $Z_{LSB}$ 312. The 6-bit MSB-side multiplication result $Z_{MSB}$ 310A and LSB-side multiplication result $Z_{LSB}$ 312 may need to be added as well, which requires three instances of 1-bit half adders (HA) and three instances of 1-bit full adders (FA) because of the 2-bit left shift in MSB-side multiplication result $Z_{MSB}$ 310A before addition. Since 1-bit FAs are required only if there are three inputs, it may suffice to have 3FAs and 3HAs.

In accordance with some embodiments of the present disclosure, the architecture 300 is optimized for performing multiplication operations in MAC-based neurons as well as single instruction multiple data (SIMD) applications using D&C. In some embodiments, the architecture 300 is configured to perform a multiplication operation 302 that comprises a SIMD operation on data inputs, Y, 302B, with one operand, weights, W, 302A being fixed. Since weights, W, 302A is fixed, multiplying it with "00," "01," "10," or "11" generates the same results (as opposed to the scenario with programmable W in multiplication operation 202). As such, a "0" and a "1" may be stored for the smaller (4-bit×2-bit) multiplications, and fixed connections of the stored "0" and "1" to the MUX inputs may be made according to the fixed/known values of the (4-bit×2-bit) multiplications. As such, a hardware requirement for the architecture 300 may comprise 4 SRAMs (which may also be reduced to 2 if connecting the same two bits to both the (4-bit×2-bit) multipliers), 36 instances of a 2:1, 1-bit MUX, 3 instances of 1-bit HA, and 3 instances of 1-bit FA. However, the number of actual SRAMs may also depend on fanout considerations. For example, 2 cells are shown for either the MSB-side multiplication 304 and LSB-side multiplication 306. This approach may only be applicable to special scenarios with fixed weights (such as SIMD applications), and not for programmable weights.

A select input for a MUX that is associated with the MSB-side multiplication 304 may be associated with the most significant 2-bits of inputs, Y, 302B, and similarly, a select input for a MUX that is associated with the LSB-side multiplication 306 may be associated with the least significant 2-bits of inputs, Y, 302B. The MSB-side multiplication result $Z_{MSB}$ 310A may still be left shifted (308), for example, via one or more shift registers, by 2-bits to obtain 6-bit MSB-side multiplication result $Z_{MSB}$ 2-bit left shifted 310B, which is added to the LSB-side multiplication result $Z_{LSB}$ 312 to produce a computing operation output 314 of the multiplication operation 302.

Figure 4:
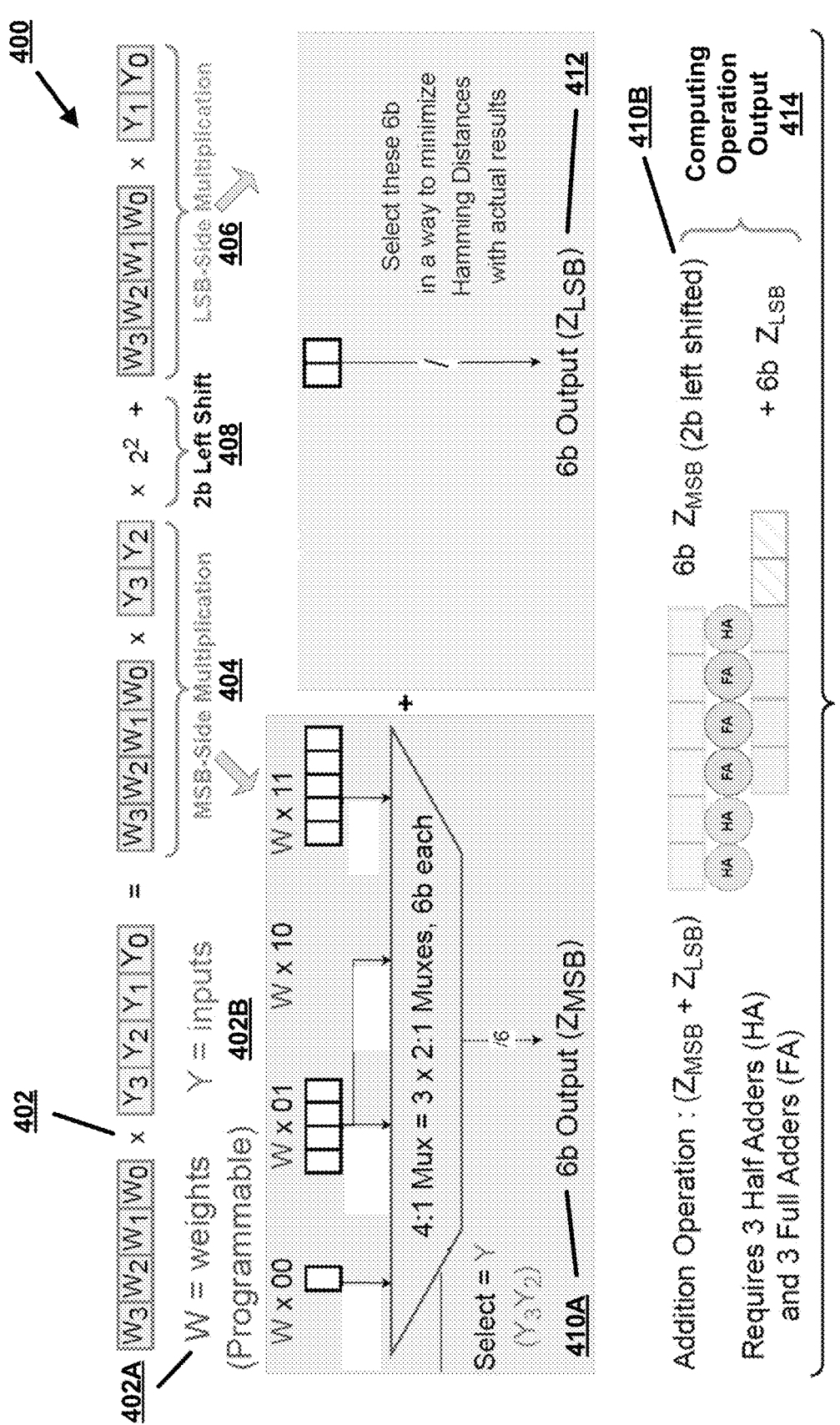
FIG. 4 is a diagram of an example architecture that approximates the LSB-side multiplication result to a fixed value in accordance with some embodiments discussed herein.

FIG. 4 is a diagram of an example architecture 400 that is simplified by approximating the LSB-side multiplication result to a fixed value in accordance with some embodiments. In some embodiments, the architecture 400 is configured to perform a multiplication operation 402 of weights, W, 402A and inputs, Y, 402B. The multiplication operation 402 may be distributed into MSB-side multiplication 404 and LSB-side multiplication 406. LSB-side multiplication 406 may comprise an approximation to a fixed value. Approximating the LSB-side multiplication's 406 result to a fixed value may comprise determining a fixed value for LSB-side multiplication result $Z_{LSB}$ 412 in a way that minimizes a Hamming distance between the selected value for LSB-side multiplication result $Z_{LSB}$ 412 and the actual possible values of LSB-side multiplication result $Z_{LSB}$ 412. The result of the MSB-side multiplication result $Z_{MSB}$ 410A may be left shifted (408), for example, via one or more shift registers, by 2-bits to obtain 6-bit MSB-side multiplication result $Z_{MSB}$ 2-bit left shifted 410B, which may be added to the LSB-side multiplication result $Z_{LSB}$ 412 to produce a computing operation output 414 of the multiplication operation 402.

The MSB-side multiplication 404 may comprise same hardware as in FIG. 2B and FIG. 3, while the LSB-side multiplication 406 may only require a specific combination of 0s and 1s, thereby optimizing overall hardware requirements. That is, simplification of the LSB-side multiplication 406 may be implemented by utilizing only two bits of storage, eliminating the need for a MUX entirely. Accordingly, a total hardware requirement for the architecture 400 may comprise 12 SRAMs, 18 instances of a 2:1, 1-bit MUX, three instances of 1-bit HA, and three instances of 1-bit FA.

Simplifying the D&C approach may be useful in certain approximation computing problems (such as neuromorphic computing where high error tolerance is acceptable), where multiple LSBs may be ignored or approximated to fixed values without a significant degradation in the accuracy of either the result of the operation, or without any significant degradation in the accuracy of a final result of an overall application. As such, improved efficiency and faster processing may be achieved while maintaining an acceptable level of accuracy within the specific problem domain.

In some embodiments, approximating a LSB comprises determining a fixed $Z_{LSB}$ by selecting a value that minimizes the Hamming distance between the selected $Z_{LSB}$ and potential values of the $Z_{LSB}$. Selecting a value for a $Z_{LSB}$ aims to optimize accuracy of LSB approximation while minimizing any loss in precision. In some embodiments, selecting the fixed $Z_{LSB}$ value comprises an analysis that certain values within the range of 0-63 cannot be the result of the (4-bit× 2-bit) LSB-side multiplication 406, for example, 17, 19, 23, 25, 29, 31, 32, 34, 35, 37, 38, 40, 41, 43, 44, and 46-63, which is depicted in FIG. 5A.

Figure 5A:
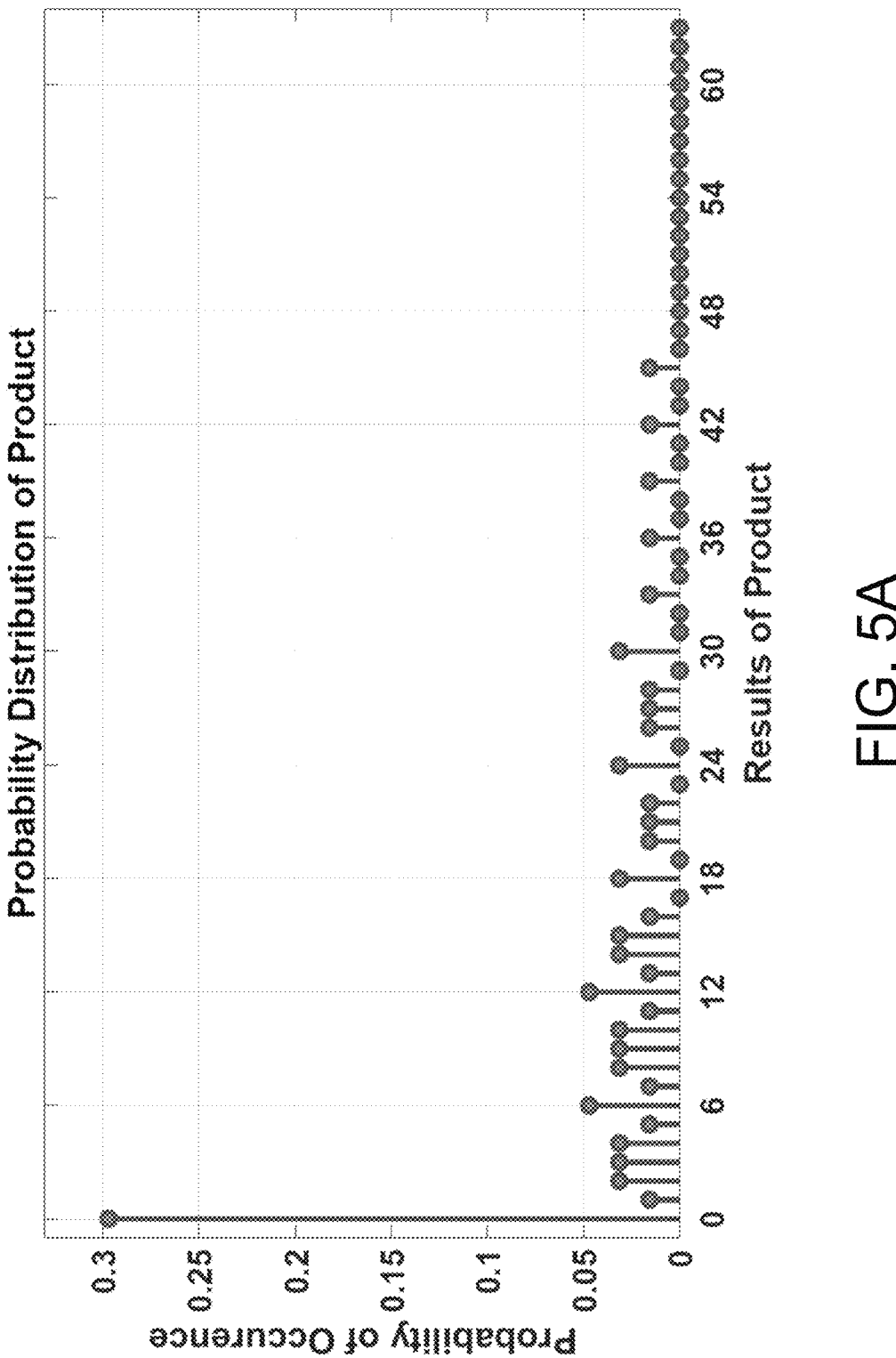
FIG. 5A is an example chart that represents probabilities of individual numbers being the outcome of a multiplication of two binary numbers in accordance with some embodiments.

FIG. 5A is an example chart of probabilities for individual numbers being the outcome of a multiplication of two binary numbers in accordance with some embodiments. As depicted in FIG. 5A, the chart illustrates the probabilities of individual numbers within a range of 0-63 resulting from a 4-bit×2-bit LSB-side multiplication where a first operand may be randomly chosen from 0-15 and a second operand may be randomly chosen from 0-3, both with equal probability. FIG. 5A further depicts that certain values cannot be the result of the multiplication (e.g., 17, 19, 23, 25, 29, 31, 32, 34, 35, 37, 38, 40, 41, 43, 44 and 46-63) being the result of a (4-bit×2-bit) LSB-side multiplication.

Figure 5B:
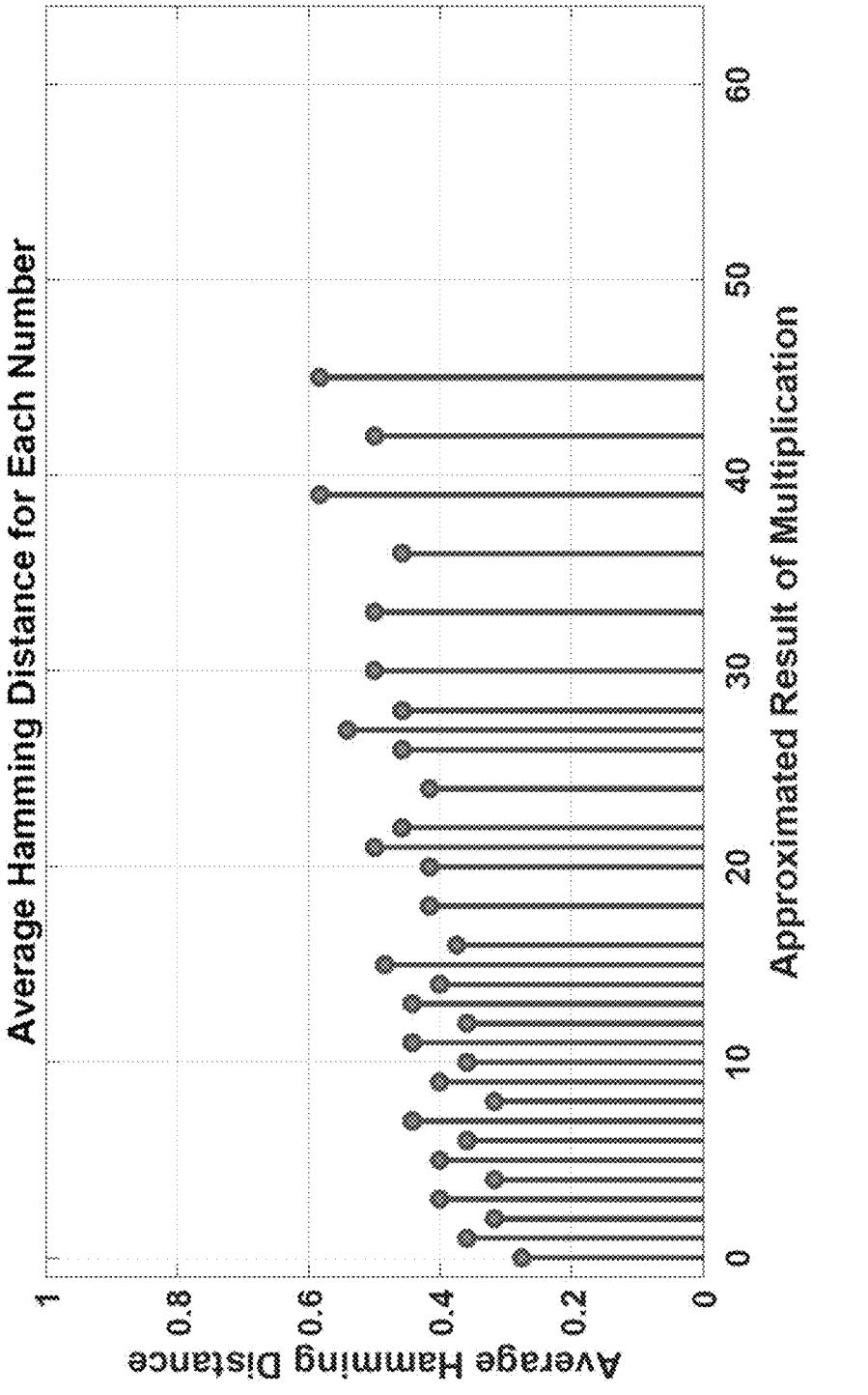
FIG. 5B is an example chart of Hamming distances for a range of possible numbers that is compared with approximated results of LSB-side multiplications in accordance with some embodiments.

FIG. 5B is an example chart of Hamming distances for a range of possible numbers that is compared with approximated results of LSB-side multiplications in accordance with some embodiments. According to various embodiments of the present disclosure, a Hamming distance may be used as a metric to evaluate precision of estimated results derived from (4-bit×2-bit) LSB-side multiplications. In some embodiments, the Hamming distance may comprise a measurement of dissimilarity or discrepancy between two binary strings by counting the differing bits. As depicted in FIG. 5B, the x-axis denotes possible 6-bit approximated results between "0" through "63" (or 000000 through 111111), while the y-axis depicts the average hamming distance from a probabilistic actual value of a multiplication. FIG. 5B further depicts that an approximated value of $Z_{LSB}$=0 has the lowest hamming distance. Notably, the lowest Hamming distance of 0.275 is obtained when the approximated value of a LSB multiplication is "0" based on the probability of a result of a LSB-side multiplication being "0" is highest out of possible 63 values.

Figure 6:
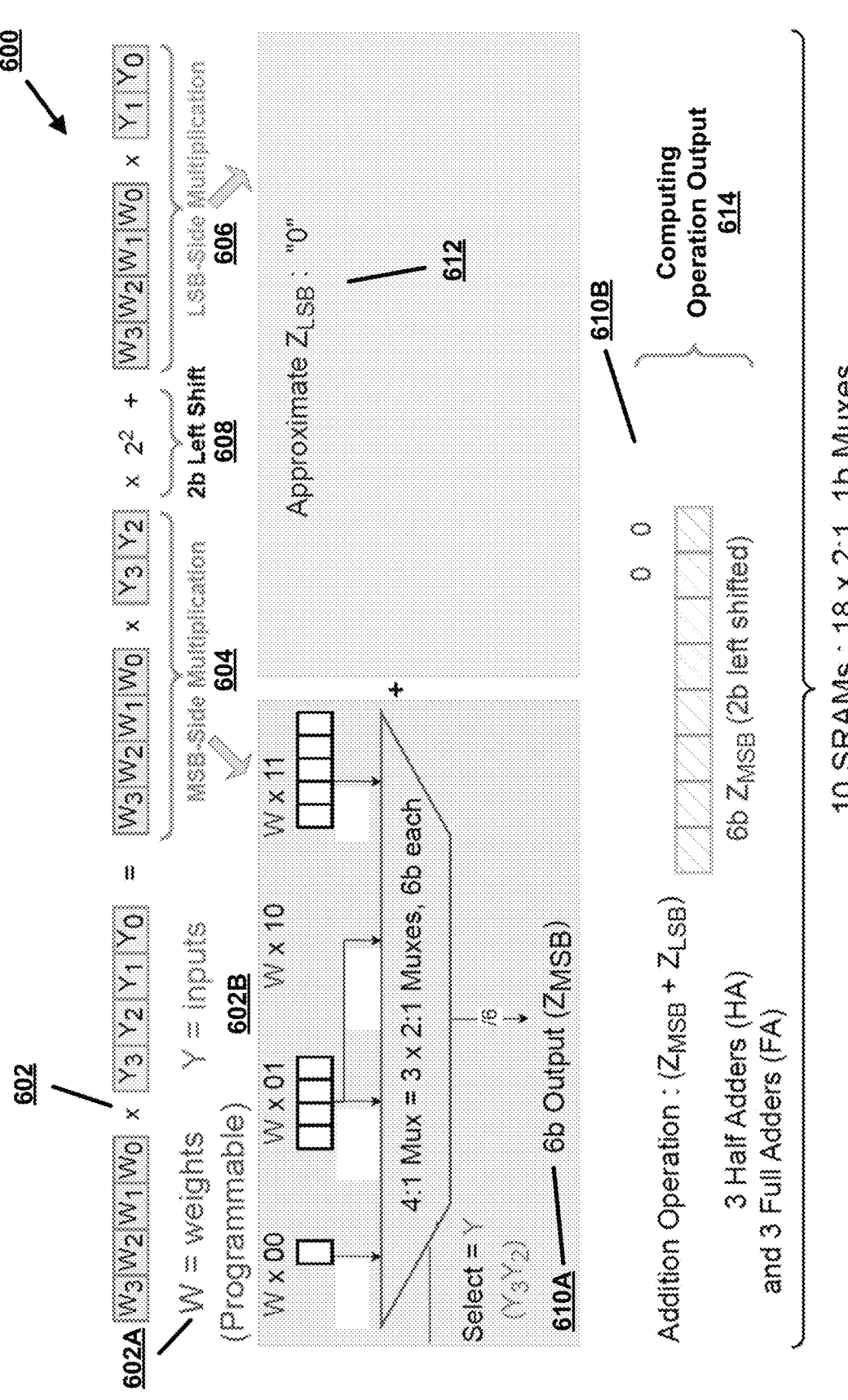
FIG. 6 is a diagram of an example architecture for approximating LSB-side multiplication to zero in accordance with some embodiments discussed herein.

FIG. 6 is a diagram of an example architecture 600 for approximating LSB-side multiplication to zero in accordance with some embodiments. In some embodiments, the architecture 600 is configured to perform a multiplication operation 602 of weights, W, 602A and inputs, Y, 602B. The multiplication operation 602 may be distributed into MSB-side multiplication 604 and LSB-side multiplication 606. value. The MSB-side multiplication 604 may comprise same hardware as in FIG. 2B and FIG. 3. Given the LSB-side multiplication 606 may comprise an approximation to "0" ($Z_{LSB}$=0), no additional storage and/or MUXing are needed for LSB-side multiplication result $Z_{LSB}$ 612. Furthermore, as LSB-side multiplication result $Z_{LSB}$ 612 is approximated to "0," no values from LSB-side multiplication result $Z_{LSB}$ 612 are added to MSB-side multiplication result $Z_{MSB}$ 610A to generate MSB-side multiplication result $Z_{MSB}$ 2-bit left shifted 610B (e.g., 2-bit left shift 608 via one or more shift registers), which comprises a computing operation output 614 of the multiplication operation 602. Hence, an overall hardware requirement for the architecture 600 may comprise 10 SRAMs, and 18 instances of a 2:1, 1-bit MUX and no HA or FA would be required.

Figure 7:
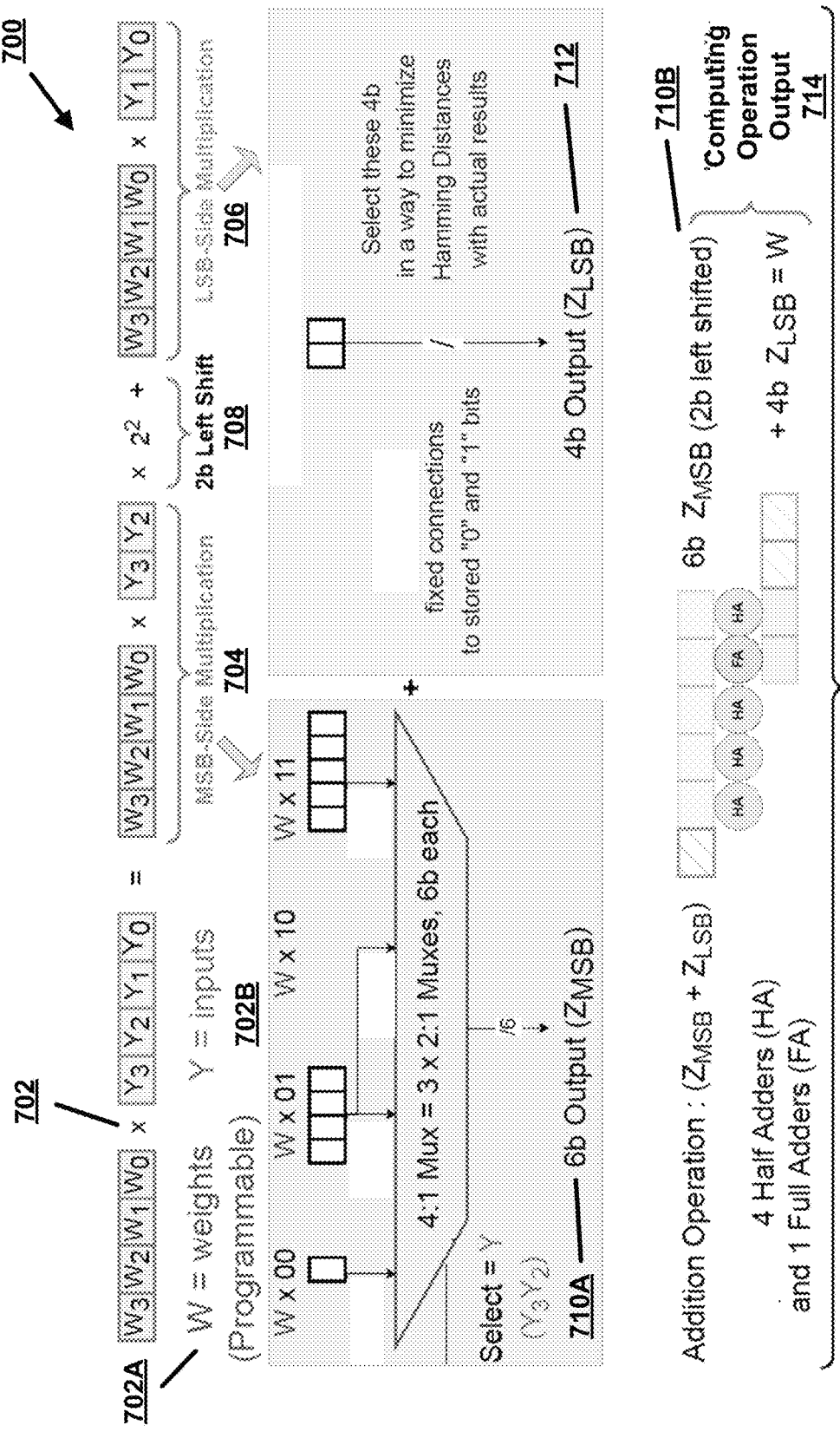
FIG. 7 is a diagram of an example architecture for approximating LSB-side multiplication to a programmable weight operand value in accordance with some embodiments discussed herein.

FIG. 7 is a diagram of an example architecture 700 for approximating LSB multiplication as a function of a programmable weight operand in accordance with some embodiments. In some embodiments, the architecture 700 is configured to perform a multiplication 702 of weights, W, 702A with inputs, Y, 702B. The multiplication 702 (distributed into MSB-side multiplication 704, LSB-side multiplication 706, and 2-bit left shift 708) may be determined based on an approximation that comprises a 4-bit value of W 702A for LSB-side multiplication result $Z_{LSB}$ 712.

The four LSBs of $Z_{LSB}$ may be directly linked to the W 702A, while the two most significant bits may be connected to a "0." The MSB-side multiplication result $Z_{MSB}$ 710A may be left shifted (e.g., 2-bit left shift 708), for example, via one or more shift registers, by 2-bits to obtain MSB-side multiplication result $Z_{MSB}$ 2-bit left shifted 710B, which is added to the result of the LSB-side multiplication result $Z_{LSB}$ 712 to produce a computing operation output 714 of the multiplication 702. The hardware requirements of the architecture 700 may comprise 12 SRAMs, and 18 instances of a 2:1, 1-bit MUX, 4 instances of 1-bit HA and 1 instance of 1-bit FA.

The disclosed D&C systems and methods may readily accommodate different multipliers with varying bit resolutions. Various applications, such as in artificial neural networks (ANNs), may require varied multiplier bit resolutions for performing computational operations. For example, depending on specific parameters of an ANN, a multiplier may be provided with inputs of differing resolutions. As such, embodiments of the present disclosure are adept at handling such varied conditions without compromise.

Figure 8:
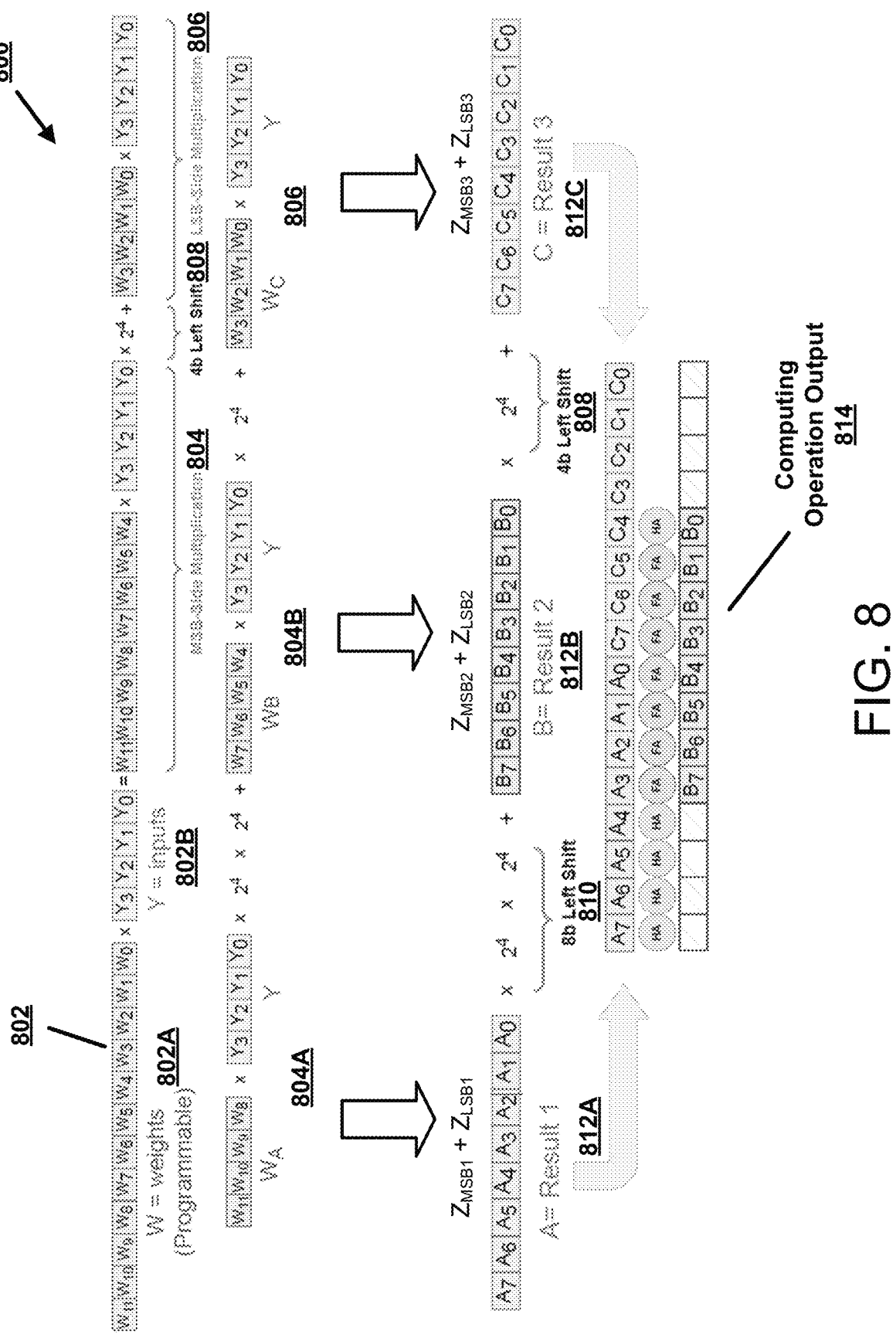
FIG. 8 is a diagram of an example architecture for performing higher bit resolution multiplication operations in accordance with some embodiments.

FIG. 8 is a diagram of an example architecture 800 for performing higher bit resolution multiplication operations in accordance with some embodiments. In some embodiments, the architecture 800 is configured to perform a multiplication 802 of 12-bit weights, W, 802A with 4-bit inputs, Y, 802B. The multiplication 802 may be distributed into MSB-side multiplication 804, LSB-side multiplication 806, and 4-bit left shift 808. The aforementioned multiplication of a 4-bit weight by a 4-bit input may serve as a foundational principle applicable to various multipliers with different bit resolutions. For example, operand values surpassing a 4-bit resolution may be divided into smaller segments, facilitating the creation of sections that comprise 4 bits in length. Accordingly, the 12-bit weight, W, 802A can be conceptualized as a concatenation of three segments $W_A$, $W_B$, and $W_C$, where $W_A$=W[11:8], $W_B$=W[7:4], and $W_C$=W[3:0].

As depicted in FIG. 8, the multiplication 802 comprises a 12-bit×4-bit, W×Y multiplication that is reformulated into two distinct computations: a MSB-side multiplication 804 (8-bit $\{W_A W_B\}$ by 4-bit Y (802B) multiplication) and a LSB-side multiplication 806 (4-bit $W_C$ by 4-bit Y (802B) multiplication). A left shift by four bits may be performed in the multiplication involving the 8-bit $\{W_A W_B\}$ by the 4-bit inputs, Y, 802B. Subsequently, the multiplication of 8-bit $\{W_A W_B\}$ by 4-bit Y can be further broken down into two smaller segments: a 4-bit $W_A$ by 4-bit Y multiplication 804A and a 4-bit $W_B$ by 4-bit Y multiplication 804B. The 4-bit $W_A$ by 4-bit Y multiplication 804A may require another left shift by four bits.

The result 812A of the 4-bit×4-bit, $W_A$×Y multiplication 804A is applied with an 8-bit left shift 810, for example, via one or more shift registers. Subsequently, the result 812B of the 4-bit×4-bit, $W_B$×Y multiplication 804B undergoes a 4-bit left shift 808, for example, via one or more shift registers. The result 812C of a 4-bit×4-bit, $W_C$×Y LSB-side multiplication 806 directly progresses to a next stage without alteration. Considering the 8-bit left shift 810 in the $W_A$×Y multiplication 804A and the direct progression of the $W_C$×Y LSB-side multiplication 806 to the next stage, a combined result may be generated by concatenating the result 812A (applied with 8-bit left shift 810) with the result 812C. Adding the result 812B to the combined results by using FAs and HAs may provide a computing operation output 814. Accordingly, a 12-bit×4-bit, W×Y multiplication may be split into three 4-bit×4-bit, W×Y multiplications.

The architecture 800 significantly reduces the necessity for FAs and HAs or other components necessary for achieving a multiplier with increased bit resolution, especially as the input parameters (e.g., inputs, Y, 802B) surpasses four bits.

Figure 9:
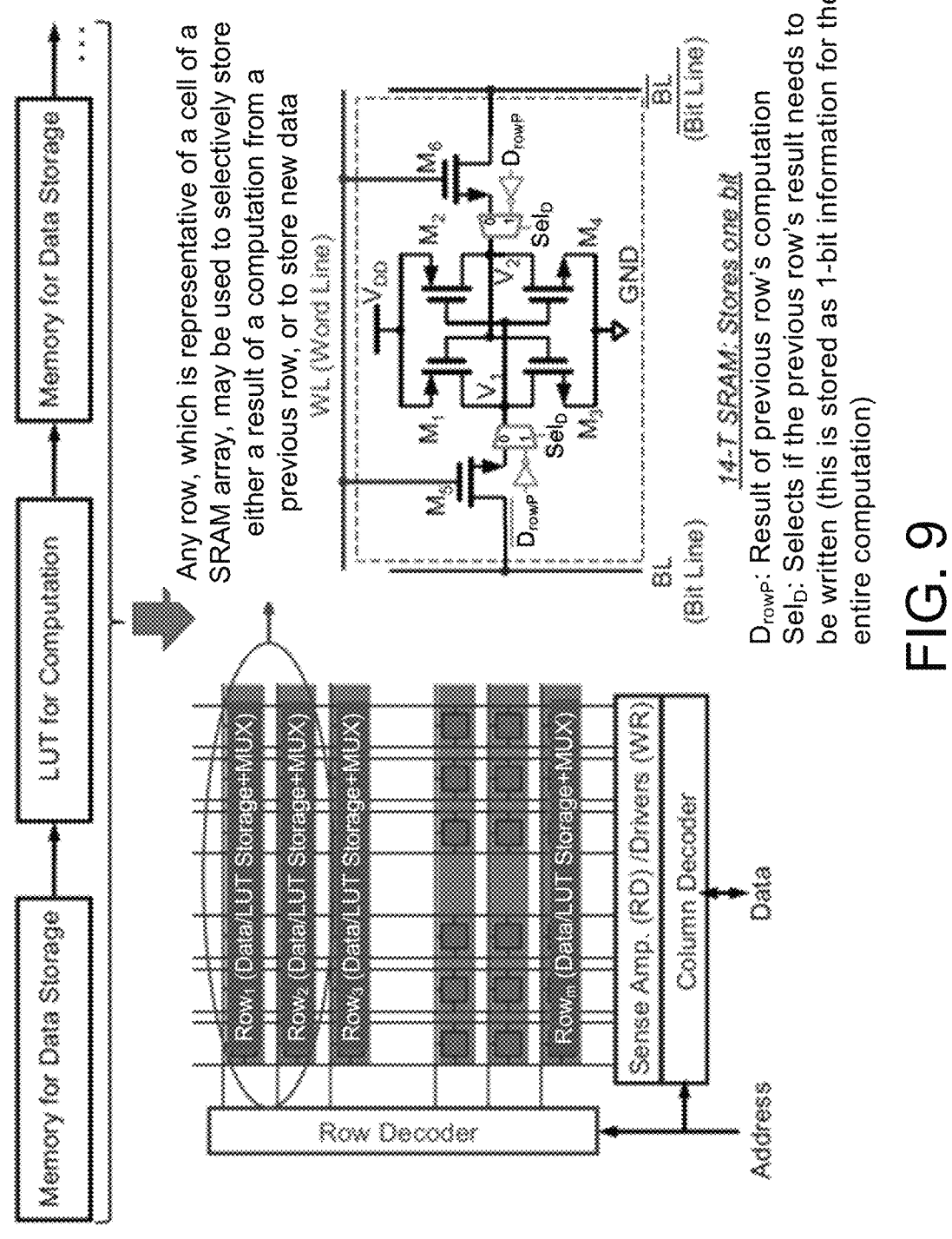
FIG. 9 illustrates an example of a memory architecture for LUT-based CiM supporting multi-level, multi-cycle operations in accordance with some embodiments discussed herein.

Referring to FIG. 9, an example of a memory architecture for LUT-based CiM to support multi-level, multi-cycle operations with maximum programmability and scalability is depicted. The depicted memory architecture may be configured to store a result of a computation into a memory array for access during other computations (e.g., to implement multi-level programmable logic operations) to allow for implementation of cascaded logic inside memory with each level of logic implemented as a LUT. For example, every row comprising a cell of a SRAM array may be used to selectively store either a result of a computation from a previous row, or to store new data similar to traditional memory. The depicted memory architecture may comprise one or more MUXes in a data read/write path. The select for the one or more MUXes may also be stored in the memory array. The select may comprise only 1-bit of information required for an entire computation (whether to implement cascaded logic or not) and may be amortized over the entire memory. Including a budget for data reshaping/buffering inverters, a total number of transistors required for one of the depicted SRAM cells may be 14 (6 for the traditional SRAM+4 for the MUXes+4 for the inverters).

Figure 10:
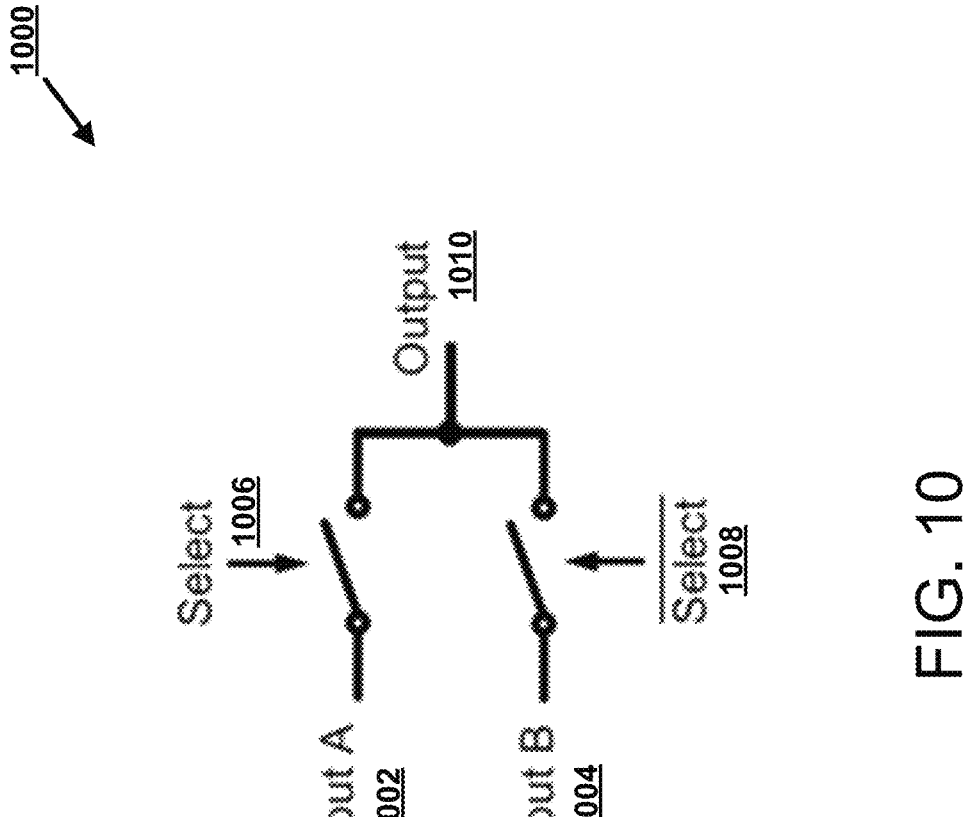
FIG. 10 illustrates an example implementation of a 2:1 MUX using two switches in accordance with some embodiments discussed herein.

FIG. 10 depicts an implementation of a 2:1 MUX using two switches. In a traditional MUX, an inverted select input is created from a select input by using a digital inverter. For SRAM-based CiM, an inverted select input of a MUX 1000 does not need to be created separately. Instead, both select input and inverted select input are available as Input A 1002 and Input B 1004 in the SRAM itself and may be switched accordingly. Depending on application, select switch 1006 and select switch 1008 may be either a pass gate, or a CMOS complementary switch that generates an output 1010.

Figure 11:
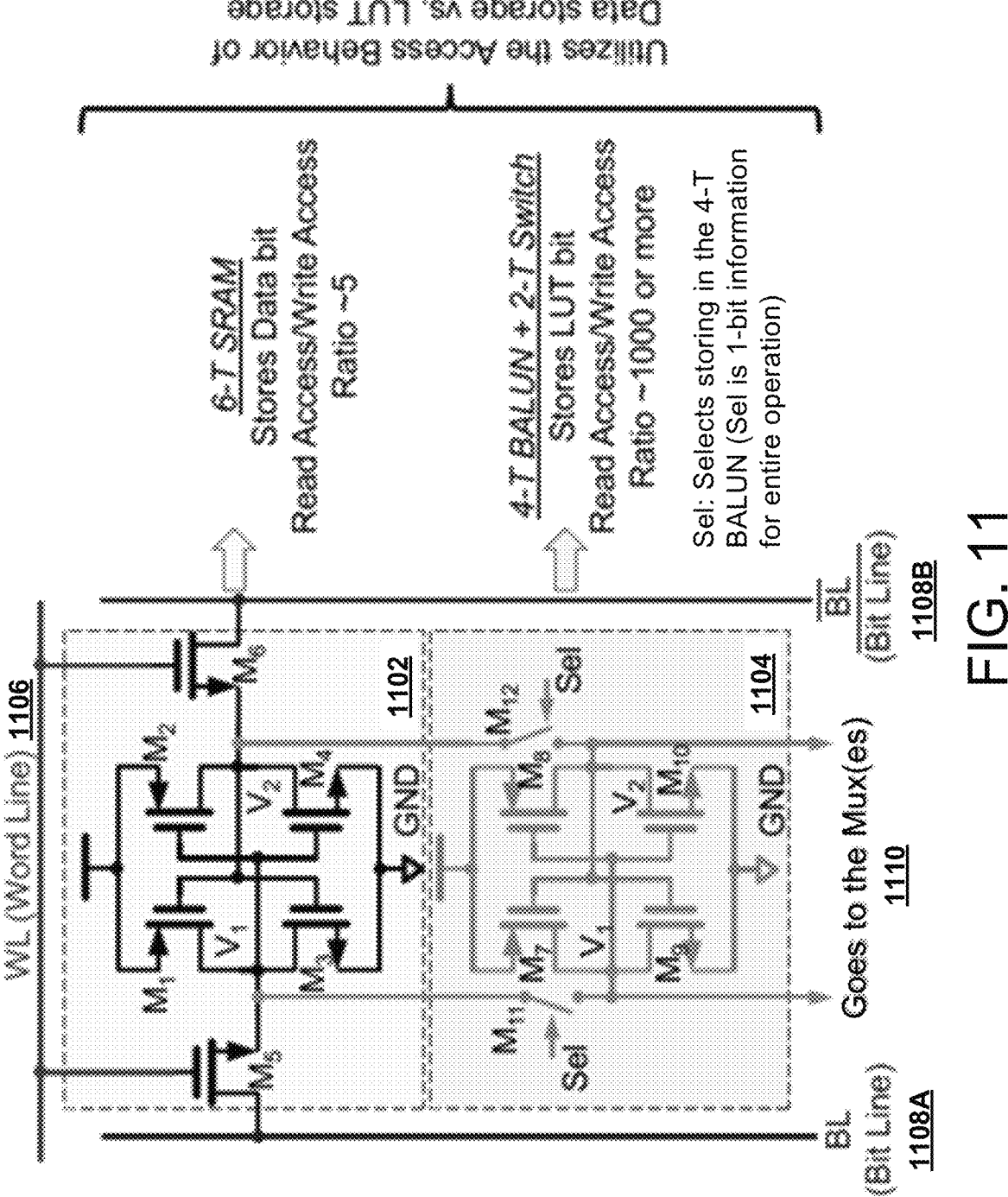
FIG. 11 illustrates an example implementation of optimized memory access by combining conventional data memory access behavior with LUT memory in accordance with some embodiments discussed herein.

FIG. 11 depicts an example implementation of optimized memory access by combining conventional data memory access behavior with LUT memory. Data read and written using conventional SRAM architecture, such as the 6-T SRAM cell 1102, may be via a word line 1106 and bit lines 1108A and 1108B. In conventional data memory, the ratio of read to write may be about 5:1. On the other hand, LUT memory may require fewer number of write accesses, as LUT data may be written just once for one particular computation, but possibly more read accesses. However, LUT memory read accesses need not be through the bit lines 1108A and 1108B but may instead be performed locally by accessing input of CiM MUXes 1110. As such, it may be beneficial to minimize access to large access/pass transistors in memory (e.g., 6-T SRAM cell 1102) cells for storing data that may instead be stored in LUT memory. As further depicted in FIG. 11, LUT data may be stored in a floating 4-transistor (4-T) latch circuit 1104 connected in parallel to a SRAM latch of 6-T SRAM cell 1102 with two switches, while traditional data storage may be performed in the 6-T SRAM cell 1102. Accordingly, the capacitive loading on the word and bit lines may be reduced due to utilization of LUT cells (as the LUT cells are not being connected to them) and would remove the need for large access/pass transistors in the 4-T latch circuit 1104.

Example System Operations

Various embodiments of the present disclosure describe steps, operations, processes, methods, functions, and/or the like for performing LUT-based computations.

Figure 12:
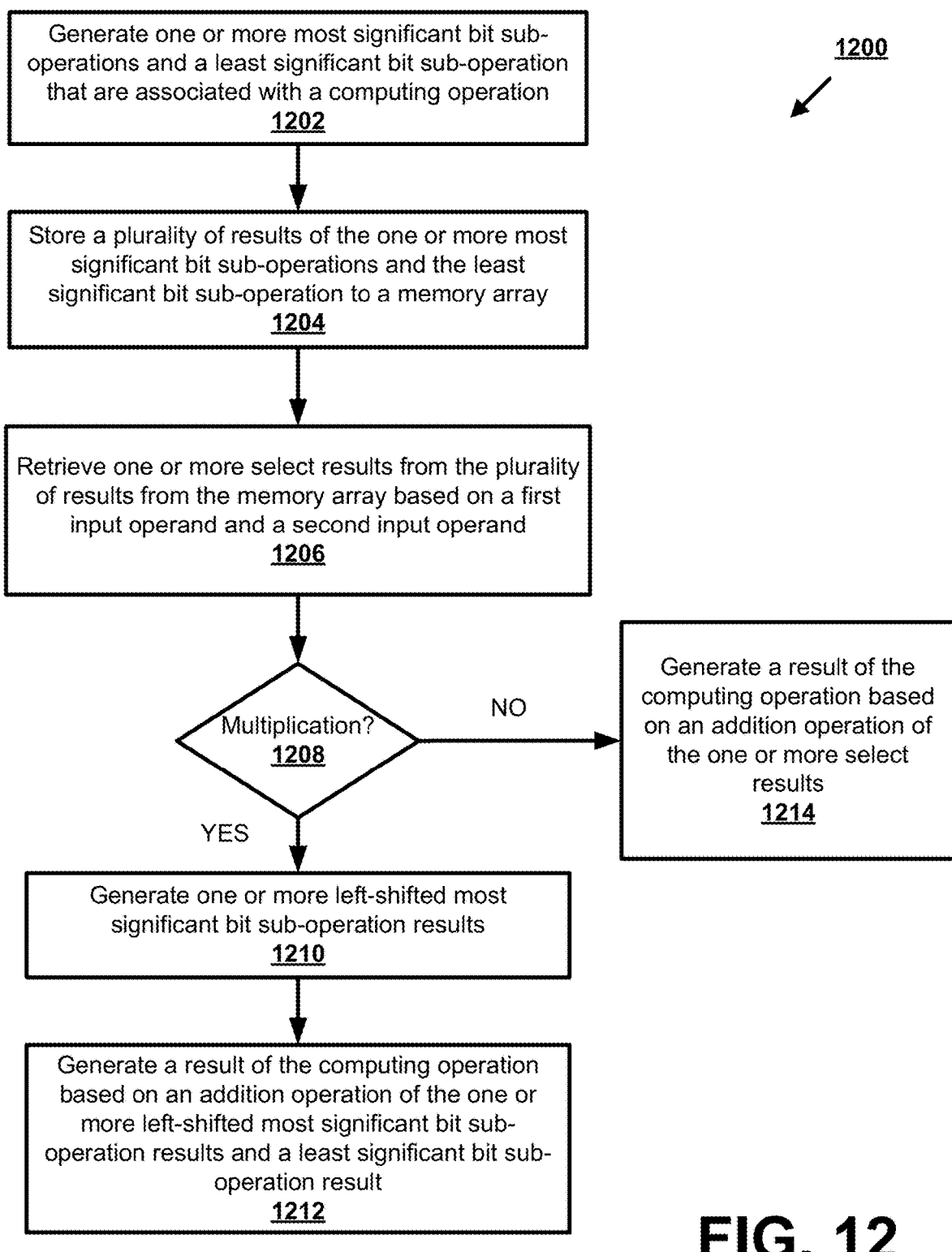
FIG. 12 illustrates a flowchart of an example process for performing a multiplication operation in accordance with some embodiments discussed herein.

FIG. 12 presents a flowchart of a process for performing a multiplication operation according to some embodiments of the present disclosure. The process 1200 includes example operations that may be performed by an apparatus, and the apparatus comprises means, such as a processing element, non-volatile memory, volatile memory, and/or the like, for performing the example operations.

At step 1202, one or more most significant bit sub-operations and a least significant bit sub-operation are generated that are associated with a computing operation. Generating the one or more most significant bit sub-operations and the least significant bit sub-operation may comprise distributing the computing operation into one or more most significant bit multiplication operations and a least significant bit multiplication operation. The computing operation may comprise a 4-bit multiplier, for example, a 4-bit×4-bit multiplication of a first 4-bit operand and a second 4-bit operand. In some example embodiments, the computing operation is distributed into two separate computing sub-operations comprising a most significant bit 4-bit×2-bit computing sub-operation for the most significant 2-bits of the second operand 4-bit operand and a least significant bit 4-bit×2-bit computing sub-operation for the least significant 2-bits of the second operand.

In some embodiments, the first 4-bit operand may be programmable and each of the two separate computing sub-operations may comprise multiplying the variable first 4-bit operand with any of "00," "01," "10," or "11" associated with a 2-bit operand. In some embodiments, the first 4-bit operand may be fixed and each of the two separate computing sub-operations may comprise multiplying the fixed first 4-bit operand with any of "00," "01," "10," or "11" associated with a 2-bit operand.

In some embodiments, the least significant bit 4-bit×2-bit computing sub-operation may comprise an approximation to a fixed value. For example, approximating the result of the least significant bit 4-bit×2-bit computing sub-operation to a fixed value may comprise selecting a fixed value comprising a least Hamming distance between the selected fixed value and actual possible values of the result of the least significant bit 4-bit×2-bit computing sub-operation. In some embodiments, the least significant bit 4-bit×2-bit computing sub-operation may be approximated to "0." In some embodiments, the least significant bit 4-bit×2-bit computing sub-operation may be approximated to the first 4-bit operand.

In some other example embodiments, the computing operation is distributed into three or more separate computing sub-operations comprising two or more most significant bit 4-bit×4-bit computing sub-operations and a least significant bit 4-bit×4-bit computing sub-operation (e.g., a 12-bit× 4-bit, W×Y multiplication may be split into three 4-bit×4-bit, W×Y multiplications).

At step 1204, a plurality of results of the one or more most significant bit sub-operations and the least significant bit sub-operation are stored to a memory array. Storing the one or more most significant bit sub-operations and the least significant bit sub-operation to the memory array may comprise pre-computing (e.g., using the optimization techniques as disclosed herewith) the one or more most significant bit sub-operations and the least significant bit sub-operation to reduce an amount of storage required for the computing operation. Each of the plurality of results may be stored in respective one or more memory cells of the memory array. In some embodiments, the plurality of results of the one or more most significant bit sub-operations and of the least significant bit sub-operation comprises (i) a plurality of most significant bit sub-operation results based on a plurality of first input operand values and a plurality of second input operand values and (ii) a plurality of least significant bit sub-operation results based on the plurality of first input operand values and the plurality of second input operand values. In some embodiments, one or more of the plurality of least significant bit sub-operation results comprise one or more fixed values that are associated with one or more approximated results of performing a least significant bit sub-operation. Storing the plurality of results may further comprise storing a select signal for one or more multiplexers in the data read/write path.

At step 1206, one or more select results from the plurality of results are retrieved from the memory array based on a first input operand and a second input operand. Retrieving the select ones of the plurality of results may comprise retrieving, by one or more processors that are communicative coupled to the memory array and based on data inputs and select inputs that are associated with the first input operand and the second input operand, one or more most significant bit sub-operation results and a least significant bit sub-operation result from respective memory cells of the memory array. For example, the select ones of the plurality of results may be retrieved by providing one or more MUXes with data inputs and select inputs that are associated with the first input operand and the second input operand. In some embodiments, the one or more most significant bit sub-operation results and the least significant bit sub-operation result comprise distributed sub-operation results associated with a computing operation with the first input operand and the second input operand. In some embodiments, the first input operand is associated with one or more weights (e.g., of an ANN) and the second input operand is associated with input data. According to various embodiments of the present disclosure, the select ones of the plurality of results may be retrieved from specific memory cells (associated with the one or more most significant bit sub-operation results and the least significant bit sub-operation associated with a computing operation with the first input operand and the second input operand) selected from the memory array via MUXes and/or fixed connections to "0" and "1" bits (e.g., according to fixed/known values of most significant bit sub-operations and/or least significant bit sub-operations).

At step 1208, a determination is made of whether the computing operation is a multiplication operation. If the computing operation is a multiplication operation, at step 1210, one or more left-shifted most significant bit sub-operation results are generated. Generating the one or more left-shifted most significant bit sub-operation results may comprise applying one or more left shift operations on the one or more most significant bit sub-operation results. According to various embodiments of the present disclosure, a left shift operation by 2-bits is performed on the one or more most significant bit sub-operation results such that it may be added with the least significant bit sub-operation result to perform a multiplication operation (4-bit×4-bit multiplication). In some other example embodiments, a 12-bit×4-bit, W×Y multiplication may comprise applying an 8-bit leftward shift on a first most significant bit sub-operation result and applying a 4-bit leftward shift on a second most significant but sub-operation result.

At step 1212, a result of the computing operation is generated based on an addition operation of the one or more left-shifted most significant bit sub-operation results and the least significant bit sub-operation result.

If the computing operation is not a multiplication operation, at step 1214, a result of the computing operation is generated based on an addition operation of the one or more most significant bit sub-operation results and the least significant bit sub-operation result.

Embodiments of the present disclosure are not limited to the disclosed examples and may be extended to a plurality of computations other than multiplication and with operands of a variety of bit sizes, for example, 4-bit and higher implementations for low-overhead, energy efficient, and fast LUT-based programmable and scalable SRAM CiM solutions. Additionally, memory arrays for LUT-based CiM implementation may be extended to memory cells other than SRAMs.

Furthermore, embodiments of the present disclosure may be made part of SRAM arrays for CiM, processor cache memory, or as storage for field-programmable gate arrays (FPGA) in neuromorphic and digital signal processing applications.

As such, various embodiments of the present disclosure provide a LUT-based fast and efficient method for implementing scalable and programmable CiM using memory arrays. In some embodiments, the memory arrays comprise a SRAM memory array architecture that supports LUT-based implementation of a variety of mathematical operations such as multiplications and additions for CiM applications. In some embodiments, the SRAM memory array memory architecture supports scalable and programmable data use and storage in memory. In some embodiments, the method combines programmable storage in SRAMs with fast and energy-efficient logic computation in LUTs to implement low-power, low-latency, programmable CiM that utilizes fully digital implementations for better accuracy. In some embodiments, scalability of LUT-based computation is improved by using a D&C technique that distributes a complex operation (such as multi-bit multiplication) into smaller, less complex operations, which result in lower hardware resource requirement, as well as lower area and lower energy.

In some embodiments, LUT-based computation used in conjunction with the D&C approach uses optimizations in a required data storage based on expected results of individual smaller multiplications, without sacrificing the programmability and accuracy of the operation. In some embodiments, the LUT-based computation used in conjunction with the D&C approach helps to reduce the storage requirement of 4-bit×4-bit multiplication from 128 SRAM cells to 20 SRAM Cells. In some embodiments, the LUT-based computation used in conjunction with the D&C approach, helps to reduce the multiplexing hardware requirement of 4-bit× 4-bit multiplication from 120 instances of 2:1, 1-bit multiplexers to 36 instances of 2:1, 1-bit multiplexers. In some embodiments, the LUT-based computation method used in conjunction with the D&C approach, comprises an addition of two 6-bit numbers for 4-bit×4-bit multiplication, which may be implemented using 3 half adder (1-bit) and 3 full adder (1-bit) primitives.

In some embodiments, the scalability of the LUT-based computation is further improved for certain classes of operations such as SIMD using D&C for fixed weights, which helps to reduce storage requirement to storage of a "0" and a "1" due to fixed/known output of the multiplications. In some embodiments, performing SIMD using D&C helps to reduce the storage requirement of 4-bit×4-bit multiplication from 128 SRAM cells to 2 SRAM Cells. In some embodiments, performing SIMD using D&C helps to reduce the multiplexing hardware requirement of 4-bit×4-bit multiplication from 120 instances of 2:1, 1-bit multiplexers to 36 instances of 2:1, 1-bit multiplexers. In some embodiments, performing SIMD using D&C comprises addition of two 6-bit numbers for 4-bit×4-bit multiplication, which may be implemented using 3 half adders (1-bit) and 3 full adder (1-bit) primitives.

In some embodiments, the scalability of the LUT-based computation is further improved by approximating the LSB side operation's result to a fixed value to simplify the D&C approach, which may help to reduce storage requirement to storage of a "0" and a "1" for LSB-side multiplication. In some embodiments, approximating the LSB side operation's result to a fixed value may reduce storage requirement of 4-bit×4-bit multiplication from 128 SRAM cells to 12 SRAM cells for a fixed non-zero result, and 10 SRAM cells for a fixed, zero-valued result.

In some embodiments, approximating the LSB side operation's result to a fixed value may reduce multiplexing hardware requirement of 4-bit×4-bit multiplication from 120 instances of a 2:1 ratio, 1-bit multiplexers to 18 instances of a 2:1 ratio, and 1-bit multiplexers for a fixed result. In some embodiments, approximating the LSB side operation's result to a fixed value may require addition of two 6-bit numbers (or a 6-bit and a 4-bit number) for 4-bit×4-bit multiplication, which may be implemented using 3 half adders and 3 full adder primitives (or 4 half adders and 1 full adder primitives).

In some embodiments, maximum scalability and programmability may be achieved by storing a result of an operation back into memory for access to data during other operations (e.g., to implement multi-level programmable logic operations), allowing for cascaded logic (multi-level, multi-cycle) inside the memory with each level of logic implemented as a LUT. LUT-based computation and storage may be realized by utilizing certain rows/parts of rows of the SRAM array to selectively store either the result of the computation from other rows, or to store new data similar to traditional memory. In some embodiments, LUT-based computation and storage may be implemented by a MUX in the data read/write path, where the select for the MUX may be stored in memory and may require 1-bit of information required for an entire computation and may be amortized over the entire storage.

In some embodiments, a 2:1 MUX may obtain both select and inverted select inputs from a SRAM cell rather than creating an inverted select input. Depending on application, the switch for the 2:1 MUX may be either a pass gate or a CMOS complementary switch.

In some embodiments, the D&C approach may achieve up to approximately 29.5 times area benefit and up to approximately 3.3 times energy benefit as compared to traditional LUT-based operations. In some additional embodiments, approximating the LSB side operation's result to a fixed value may achieve up to approximately a 50.9 times area benefit and up to approximately 6.2 times energy benefit due to the lower transistor count, as compared to the traditional LUT-based CiM technique.

In some embodiments, the D&C approach may help to achieve scalable computation with a higher bit-precision of the inputs. As an example, for 8-bit resolution of the multiplier inputs, the D&C approach may require 36 SRAMs and 120 number of 2:1 MUXes. For 16-bit resolution of the multiplier inputs, the D&C approach may require 136 SRAMs and 432 number of 2:1 MUXes.

Conclusion

It should be understood that the examples and embodiments described herein are for illustrative purposes only and that various modifications or changes in light thereof will be suggested to persons skilled in the art and are to be included within the spirit and purview of this application.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A method for performing computations, the method comprising:
   generating, by a most significant bit multiplexer and a least significant bit multiplexer, one or more most significant bit sub-operations and a least significant bit sub-operation that are associated with a computing operation;
   retrieving, by the most significant bit multiplexer and the least significant bit multiplexer and based on a first input operand and a second input operand, one or more select results from a plurality of results that are associated with the one or more most significant bit sub-operations and the least significant bit sub-operation from a memory array, wherein the one or more select results comprises one or more most significant bit sub-operation results and a least significant bit sub-operation result;
   generating, by one or more shift registers, one or more left-shifted most significant bit sub-operation results that are associated with the one or more most significant bit sub-operation results based on a determination that the computing operation comprises a multiplication operation; and
   generating, by a plurality of adders, a result of the computing operation based on an addition operation of the one or more left-shifted most significant bit sub-operation results and the least significant bit sub-operation result.

2. The method of claim 1, wherein generating the one or more most significant bit sub-operations and the least significant bit sub-operation comprises distributing the computing operation into a most significant bit multiplication operation and a least significant bit multiplication operation.

3. The method of claim 1, wherein generating the one or more left-shifted most significant bit sub-operation results comprises applying one or more left shift operations on the one or more most significant bit sub-operation results.

4. The method of claim 1, wherein the first input operand is associated with one or more weights and the second input operand is associated with input data.

5. The method of claim 1, wherein the computing operation is associated with a multi-bit multiplier.

6. The method of claim 1, wherein the computing operation comprises a 4-bit×4-bit multiplication operation.

7. The method of claim 1, wherein the plurality of results comprises (i) a plurality of most significant bit sub-operation results based on a plurality of first input operand values and a plurality of second input operand values and (ii) a plurality of least significant bit sub-operation results based on the plurality of first input operand values and the plurality of second input operand values.

8. The method of claim 7, wherein one or more of the plurality of least significant bit sub-operation results comprise one or more fixed values that are associated with one or more approximated results of performing the least significant bit sub-operation.

9. The method of claim 1, wherein the first input operand comprises either a programmable value or a fixed value.

10. A system for performing computations, the system comprising:
   a most significant bit multiplexer that is configured to generate a most significant bit sub-operation result that is associated with a computing operation based on a first input operand and a second input operand;
   a least significant bit multiplexer that is configured to generate a least significant bit sub-operation result that is associated with the computing operation;

one or more shift registers that are configured to generate a left-shifted most significant bit sub-operation result; and a plurality of adders that are configured to generate a computing operation output by adding the left-shifted most significant bit sub-operation result with the least significant bit sub-operation result.

11. The system of claim 10, wherein the computing operation comprises a 4-bit×4-bit multiplication operation.

12. The system of claim 10, wherein the most significant bit multiplexer or the least significant bit multiplexer comprises a plurality of 6-bit multiplexers that are configured to generate the most significant bit sub-operation result or the least significant bit sub-operation result as a 6-bit value.

13. The system of claim 10, wherein the most significant bit multiplexer or the least significant bit multiplexer comprises a 2:1 multiplexer.

14. The system of claim 10, wherein the most significant bit sub-operation result comprises a 6-bit most significant bit value and the least significant bit sub-operation result comprises a 6-bit least significant bit value.

15. The system of claim 14, wherein the plurality of adders is configured to perform an addition operation with the 6-bit most significant bit value and the 6-bit least significant bit value.

16. The system of claim 15, wherein the plurality of adders comprises three half adders and three full adders.

17. The system of claim 10, wherein the computing operation comprises a single instruction multiple data operation that is performed with the first input operand comprising a weight of a fixed value.

18. The system of claim 10, wherein the least significant bit multiplexer is configured to generate the least significant bit sub-operation result based on a fixed value.

19. The system of claim 10 further comprising a plurality of memory arrays that are coupled to the most significant bit multiplexer and the least significant bit multiplexer in a data read/write path.

20. A system comprising one or more processors and at least one memory storing processor-executable instructions that, when executed by any of the one or more processors, causes the one or more processors to perform operations comprising:

generating, using a most significant bit multiplexer and a least significant bit multiplexer, one or more most significant bit sub-operations and a least significant bit sub-operation that are associated with a computing operation;

retrieving, using the most significant bit multiplexer and the least significant bit multiplexer and based on a first input operand and a second input operand, one or more select results from a plurality of results that are associated with the one or more most significant bit sub-operations and the least significant bit sub-operation from a memory array, wherein the one or more select results comprises one or more most significant bit sub-operation results and a least significant bit sub-operation result;

generating, using one or more shift registers, one or more left-shifted most significant bit sub-operation results that are associated with the one or more most significant bit sub-operation results based on a determination that the computing operation comprises a multiplication operation; and generating, using a plurality of adders, a result of the computing operation based on an addition operation of the one or more left-shifted most significant bit sub-operation results and the least significant bit sub-operation result.

* * * * *